United States Patent
Kawakubo et al.

(12) 
(10) Patent No.: US 6,246,656 B1
(45) Date of Patent: Jun. 12, 2001

(54) REDUCED THICKNESS OF A LIGHT TRANSMISSIVE LAYER FOR A HIGH DENSITY OPTICAL DISC

(75) Inventors: Osamu Kawakubo, Saitama; Toshiyuki Kashiwagi, Tokyo; Koichi Yasuda; Masahiko Kaneko, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/063,329

(22) Filed: Apr. 20, 1998

(30) Foreign Application Priority Data

Apr. 25, 1997 (JP) .................................................. 9-109662

(51) Int. Cl.$^7$ ........................................................ G11B 7/24
(52) U.S. Cl. .................. 369/112; 369/275.2; 369/275.4; 369/283; 369/288; 428/64.4; 428/64.9
(58) Field of Search .................................... 369/288, 112, 369/275.2, 275.4, 283; 430/495.1, 270, 945; 428/64.1, 694 SL, 65, 64.9, 64.4

(56) References Cited

U.S. PATENT DOCUMENTS

| | | | |
|---|---|---|---|
| 4,711,798 | * 12/1987 | Ueda et al. | 428/64.8 |
| 5,079,135 | * 1/1992 | Matsuzawa et al. | 430/495 |
| 5,168,031 | * 12/1992 | Buckingham et al. | 430/270 |
| 5,569,517 | * 10/1996 | Tominaga et al. | 428/64.1 |
| 5,817,389 | * 10/1998 | Ono | 428/64.1 |
| 5,846,626 | * 12/1998 | Kashiwagi et al. | 428/64.1 |
| 6,054,199 | * 4/2000 | Sugiyama et al. | 428/64.1 |

FOREIGN PATENT DOCUMENTS 3-225650    10/1991    (JP) .

* cited by examiner

Primary Examiner—Thang V. Tran
Assistant Examiner—Kim-Kwok Chu
(74) Attorney, Agent, or Firm—Frommer Lawrence & Haug, LLP.; William S. Frommer; Matthew K. Ryan

(57) ABSTRACT

An optical recording medium is provided which achieves a higher recording capacity. This optical recording medium includes a base formed of thermoplastic resin which has a thickness ranging from between approximately 0.3 to 1.2 mm, a guide groove formed on the base, an information recording layer formed at least of a reflective film and an organic dye recording layer provided on the guide groove, and a light transmissive layer having a thickness ranging from between approximately 3 to 177 $\mu$m. In this optical recording medium, the unevenness $\Delta t$ of the thickness of the light transmissive layer is set within the range of:

$$\Delta t \leq \pm 5.26(\lambda/N.A.^4)(\mu m)$$

wherein N.A. represents a numerical aperture of an optical head device of the optical disk recording and/or reproducing apparatus and $\lambda$ represents the wavelength of laser light utilized by the optical disk recording and/or reproducing apparatus.

40 Claims, 6 Drawing Sheets

REDUCED THICKNESS OF A LIGHT TRANSMISSIVE LAYER FOR A HIGH DENSITY OPTICAL DISC

FIELD OF THE INVENTION

The present invention relates to an optical recording medium having a guide groove, a reflective film, an organic dye recording layer, and a light transmissive layer where information is read therefrom or recorded thereon by irradiation of light. More particularly, the present invention relates to an optical recording medium which can achieve a higher storage capacity by determining the relationship between the thickness of the light transmissive layer, the thickness unevenness of the light transmissive layer, and the skew margin (bend or warp). The present invention further relates to an optical disk apparatus for recording and/or reproducing the optical recording medium described herein.

BACKGROUND OF THE INVENTION

An optical recording medium capable of recording and/or reproducing NTSC signal data of up to four hours on one side thereof has been proposed for optical disks of the next generation. This proposed optical recording medium thereby allows a home-use video disk recorder to record and reproduce data for up to four hours, thereby functioning as a new recording medium which can be replaced with a cassette used in a current video cassette recorder (VCR).

Since the above optical recording medium has the same shape and size as a compact disc (CD), even a user accustomed to easy handling and operability of a CD will feel similar ease with use of this medium. Moreover, if the fast access feature of this optical recording medium is utilized, an optical disc apparatus is provided which not only serves as a small-sized and easily operable recorder but also has various functions such as video recording, playback, a trick play, edition, etc. that can be performed instantaneously.

It has been found that such an optical disc apparatus requires an optical recording medium having a storage capacity of at least 8 GB or more. However, optical recording mediums currently available do not have storage capacities of 8 GB or more.

A digital versatile disc (DVD) only has a storage capacity of 4.7 GB (ROM) when a wavelength $\mu$ is 0.65 $\mu$m and a numerical aperture (N.A.) is 0.6.

If a higher storage capacity is desired without any change of signal format, such as an error correction code (ECC), a modulation system or the like, establishment of the following equation (1) is required for obtaining a storage capacity of 8 GB or more.

$$4.7 \times ((0.65/0.60 \times (N.A./\lambda))^2 \geq 8 \quad (1)$$

According to the above equation (1), $N.A./\lambda \geq 1.20$ must be established. As a result, it is necessary to set the wavelength $\lambda$ of the laser light utilized by the optical disc apparatus shorter or set the N.A. higher wherein N.A. represents the numerical aperture of an optical head device of the optical disc apparatus.

In order to satisfy the above condition, if the value of N.A. is set higher, it is necessary to decrease the thickness of the light transmissive layer of the optical recording medium through which irradiated reproduction light is transmitted. This reduced thickness is necessary to compensate for a consequent reduction in the allowance for a tilt angle wherein the disk surface is displaced from a surface perpendicular to the optical axis of the optical pickup. Specifically, the tilt angle is easily affected by optical aberrations resulting from the thickness of the base of the optical recording medium.

For a similar reason, unevenness of the thickness of the light transmissive layer must be reduced to no more than a predetermined value.

OBJECTS AND SUMMARY OF THE INVENTION

Therefore, it is an object of the present invention to provide an optical recording medium which avoids the aforementioned disadvantage of the prior art.

An additional object of the present invention is to provide an optical recording medium which permits use of an optical head device for an optical disc apparatus having a relatively high numerical aperture (N.A.) and which provides for a recordable storage capacity of 8 GB or more.

According to an aspect of the present invention, an optical recording medium includes a base formed of thermoplastic resin having a thickness ranging from between approximately 0.3 to 1.2 mm, a guide groove formed on the base, an information recording layer formed of at least a reflective film and an organic dye recording layer provided on the guide groove, and a light transmissive layer having a thickness ranging from between approximately 3 to 177 $\mu$m. For this optical recording medium, the unevenness $\Delta t$ of the thickness of the light transmissive layer is set within the range of:

$$\Delta t \leq \pm 5.26(\lambda/N.A.^4)(\mu m)$$

wherein N.A. represents a numerical aperture of the optical head device of the optical disc recording and/or reproducing apparatus and $\lambda$ represents the wavelength of laser light utilized by the optical disc recording and/or reproducing apparatus.

Accordingly, an optical recording medium has been provided which achieves a storage recording capacity of at least 8 GB or more with excellent signal characteristics.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Referring now to the drawings, wherein like reference numerals are used throughout, there are illustrated preferred embodiments of an optical disk medium in accordance with the present invention. This optical disk medium includes a guide groove formed on a base (e.g., a substrate), an information recording layer formed of a reflective film and an organic dye recording layer provided on the guide groove, and a light transmissive layer provided on the information recording layer wherein a signal is recorded and/or reproduced by irradiating laser light thereon.

The optical recording medium according to the present invention is not limited to the specific structure described above. For instance, this optical recording medium can be applied to a card-shaped optical recording disk, a sheet-shaped optical recording disk and optical recording disks having other various shapes.

Generally, in an optical recording disk, a disk skew (bend or warp) margin $\theta$, the numerical aperture (N.A.) of the optical device of the optical disc apparatus and the thickness t of the light transmissive layer are related to one another. Japanese Patent Publication No. H3-225650 discloses the relationship between these parameters and the margin $\theta$ with reference to a compact disc (CD) with proven operating characteristics.

According to Japanese Patent Publication No. H3-225650, the correlation between $\theta$, N.A. and t has been established for a compact disc (CD) by the following equation as follows:

$$\theta \leq \pm 84.115(\lambda/N.A.^3/t) \quad (2)$$

This relationship can be applied as well to the optical recording medium according to the present invention.

A specific limit value of the skew (bend or warp) margin $\theta$ required when an optical disk is mass-produced is properly set to 0.4°. This limit is set due to mass production requirements of the optical disk, as if the limit value is set smaller than that set forth above, the manufactured yield of optical disks is lowered, and consequently, manufacturing costs are increased. In existing recording media, the limit value of the skew margin $\theta$ of the CD is 0.6° and that of the DVD is 0.4°.

Accordingly, the thickness of the light transmissive layer is calculated with the assumption that the wavelength of laser light of the optical disk apparatus is set shorter and a value of the numerical aperture (N.A.) of the optical head device of the optical disk apparatus is set larger under the condition of the skew margin $\theta=0.4°$. For instance, if $\lambda$ is 0.65 $\mu$m, then the value of N.A. must be 0.78 or more (which results from equation (1) above).

If the wavelength of laser light further becomes increasingly shorter and then $\lambda$ is set at 0.4 $\mu$m, then the thickness t of the light transmissive layer is set at 177 $\mu$m. In this case, if existing compact disk manufacturing equipment is utilized for manufacturing an optical disk having a substrate with a thickness of 1.2 mm is utilized, then the maximum thickness of the entire optical disk is about 1.38 mm.

A lower limit of the thickness t of the light transmissive layer is determined depending upon whether the light transmissive layer also protects a recording film or a reflective film layer. Specifically, the minimum thickness t of the light transmissive layer must be about 3 $\mu$m or more to obtain sufficient rigidity of the optical recording medium and to resist scratching or damage which may occur due to collisions of a two-element lens arrangement hereinafter described onto the surface of the light transmissive layer.

As aforedescribed, an increase of the value of N.A./$\lambda$ is required for increasing the storage capacity of the optical recording medium. In this case, in order to achieve a storage capacity of at least 8 GB, the value of N.A. must be set to at least 0.7 or more and the wavelength $\lambda$ of the laser light must be set to 0.68 or less.

While the above relationship between the thickness of the light transmissive layer and the skew (bend or warp) must be considered, the thickness t of the light transmissive layer is properly set within the range of from about 3 to 177 $\mu$m in order to allow use of a laser ranging from an existing red laser to a blue laser which is expected to be utilized prevalently in the future.

The track pitch P and the linear density d must be changed to achieve a recording capacity of at least 8 GB. A necessary condition therefor is to satisfy the following equation (3).

$$(0.74/P) \times (0.267/d) \times 4.7 \geq 8$$

$$d \leq 0.1161/P(\mu m/bit) \quad (3)$$

Therefore, when P=0.56 $\mu$m, d$\leq$0.207 $\mu$m/bit.

This example is calculated with reference to the values for a DVD-ROM (read-only memory). Accordingly, in consideration of advances in signal processing for recording and reproduction (i.e., application of partial response maximum likelihood (PRML), decrease of redundancy of the ECC, etc.), it is expected that the linear density will in the future be 15%, and hence, the track pitch P can be increased as well to that extent. Accordingly, it has been found that maximum track pitch P is set at 0.64 $\mu$m.

In addition, a tolerance for fluctuation $\Delta P$ of the track pitch is set precisely. If the optical disk has the same recording and reproducing parameters of the CD or the DVD, then the following equation (4) is obtained from a track pitch of 0.74 $\mu$m and a tolerance of $\pm 0.03$ $\mu$m employed in the DVD.

$$\Delta P \leq \pm 0.03 P/0.74 = \pm 0.04 P \quad (4)$$

Accordingly, if P=0.56, then $\Delta P \leq 35$ 0.023 $\mu$m.

In addition, unevenness of the thickness of the light transmissive layer must be improved more accurately. If the thickness of the light transmissive layer is changed from an average value based upon the design of a reproduction objective lens, the amount of aberration resulting from influence of the uneven thickness on a specific location (laser spot) is in proportion to a biquadrate of the value of the numerical aperture (N.A.) and the wavelength.

Accordingly, if it is desired to increase the recording density by increasing the value of the numerical aperture N.A. and shortening the wavelength, then the unevenness of the thickness of the light transmissive layer is reduced even more.

An example of a compact disc in current use has a numerical aperture of 0.45 and a standard tolerance for the uneven thickness of the light transmissive layer of ±100 $\mu$m. In comparison, the DVD has a numerical aperture of 0.6 and a standard tolerance of the uneven thickness of the light transmissive layer of ±30 $\mu$m.

If the allowance amount for the uneven thickness of the light transmissive layer in the compact disc is employed as a reference, then the unevenness $\Delta t$ of the thickness of the light transmissive layer is expressed by the following equation (5).

$$\Delta t = \pm (0.45/N.A.)^4 \times (\lambda/0.78) \times 100 = \pm 5.26 \times (\lambda/N.A.^4) \mu m \quad (5)$$

(wherein N.A. represents a numerical aperture of an optical h device of the optical recording and/or reproducing apparatus.)

Figure 1:
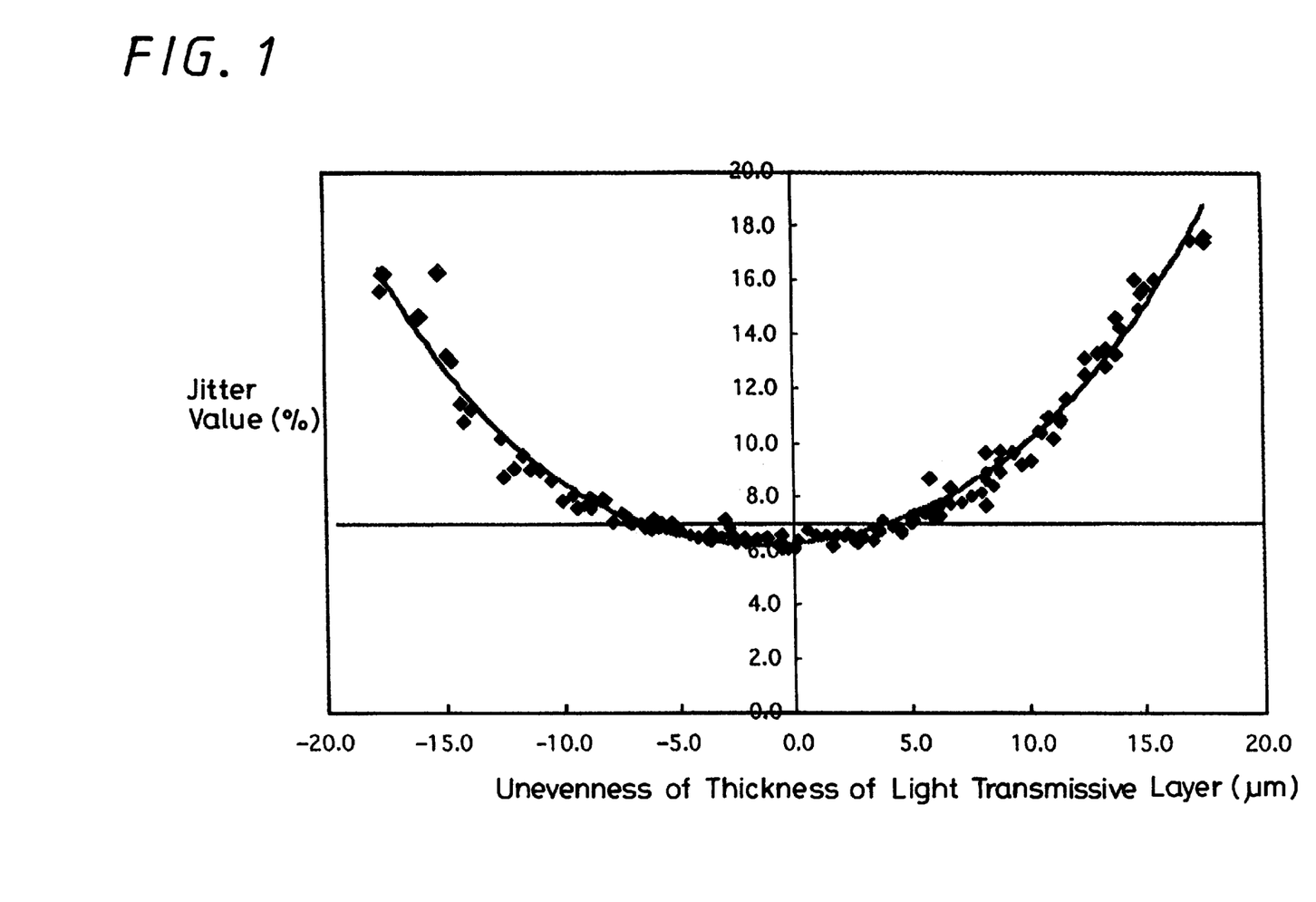
FIG. 1 is a graph plotting experimental data relative to the unevenness of thickness of light transmissive layer ($\mu$m) vs. jitter value (%).

FIG. 1 shows experimental results of the relationship between the unevenness of the thickness of the light transmissive layer and a jitter value obtained when the average thickness of the light transmissive layer is 100 $\mu$m and when the wavelength is 0.68 $\mu$m and the numerical aperture is 0.875.

FIG. 1 demonstrates that when the jitter value is 7% (which is a jitter reference obtained when no fluctuation or deviation occurs due to a resulting from the skew (bend or warp)), the unevenness of the thickness of the light transmissive layer is about ±6 $\mu$m. Since this value is substantially equal to the value obtained utilizing equation (5), a satisfactory signal can be obtained utilizing a disk medium satisfying this standard.

Therefore, the allowance for the unevenness $\Delta t$ of the thickness of the light transmissive layer must be within the range of $\pm 5.26 \times (\lambda/N.A.^4)$.

Since for purposes of these calculations, it is assumed that the thickness of the light transmissive layer is uniform wherein the optical disk surface is irradiated with a recording and reproducing laser, any aberration thereof can be corrected by displacing the focus point of the laser. However, if the thickness of the light transmissive layer is uneven in this irradiation area (i.e., in the spot location irradiated), correction of any aberration by adjusting the focus point is impossible. In order to correct any aberration by adjusting the focus point, this unevenness $\Delta t$ must be reduced to $\pm 3\lambda/100$ or less with respect to an average value of the thickness.

Moreover, although the eccentricity E of the DVD is 50 $\mu$m, the eccentricity E of an optical recording disk may be determined by the following equation (6)', $$E \leq 50 \times P/0.74 = 67.57P(\mu m) \quad (6)$$

Based upon the foregoing, the conditions required for an optical recording medium to achieve a high density allowing a storage capacity of at least 8 GB now follows.

An optical disk recording and reproducing apparatus is utilized wherein the wavelength $\lambda \leq 0.68$ $\mu$m and N.A./$\lambda \geq 1.20$. The optical recording medium includes a light transmissive layer having a thickness t between approximately 3 to 177 $\mu$m and a thickness unevenness $\Delta t \leq \pm 5.26$ $(\lambda/N.A.^4)$ ($\mu$m). The optical recording medium also has the track pitch $P \leq 0.65$ $\mu$m, the tolerance $\Delta P \leq \pm 0.04P$, the linear density $d \leq 0.1161/P$ ($\mu$m/bit), the disc skew (bend) $\theta \leq 84.115 \times (\lambda/N.A.^3/t)$, the eccentricity $E \leq 67.75P(\mu m)$, and a surface roughness $Ra \leq \pm 3\lambda/100$ (in the specific irradiation area).

A base, e.g., a substrate, of the optical recording medium is formed by an injection molding process which employs a stamper which achieves a pitch and pitch fluctuation along the surface thereof which satisfies the above-mentioned specifications required for the optical recording medium according to the present invention.

Since it is difficult to manufacture such a high-accuracy stamper requiring reduced pitch fluctuation by conventional machines performing a screw feeding operation, the required stamper is manufactured by an original disk exposing device having a linear motor feeder.

Moreover, the optical system of the disk recording and reproducing apparatus is covered with a cover for eliminating movement of air. In addition, the optical system has a vibroisolating material provided between the laser and an exposing device for removing vibration of cooling water for an exposure laser.

In this embodiment, a guide groove is formed on the base (i.e., the substrate), and a reflective film, an organic dye recording layer and a light transmissive layer are formed on the guide groove.

In addition, since a signal is recorded and reproduced by irradiating a light beam on the substrate through the light transmissive layer, the groove (pit) of the guide groove structure is formed considering the deformation of a recording pit caused by depositing the recording film layer.

For example, if asymmetry of a signal pit of a signal pit series corresponding to a storage capacity of 10 GB is 25% when the signal pit is viewed from the substrate (base) side, then the asymmetry of the signal pit viewed from the side opposite to the side of the substrate is 10%. Specifically, since the signal is read out from the side of the light transmissive layer which is the side opposite to the side of the substrate, the asymmetry of the pit must be 25% when the substrate is formed, in order to form a pit having the asymmetry of 10% when the pit is viewed from the side of light irradiation.

Figure 2:
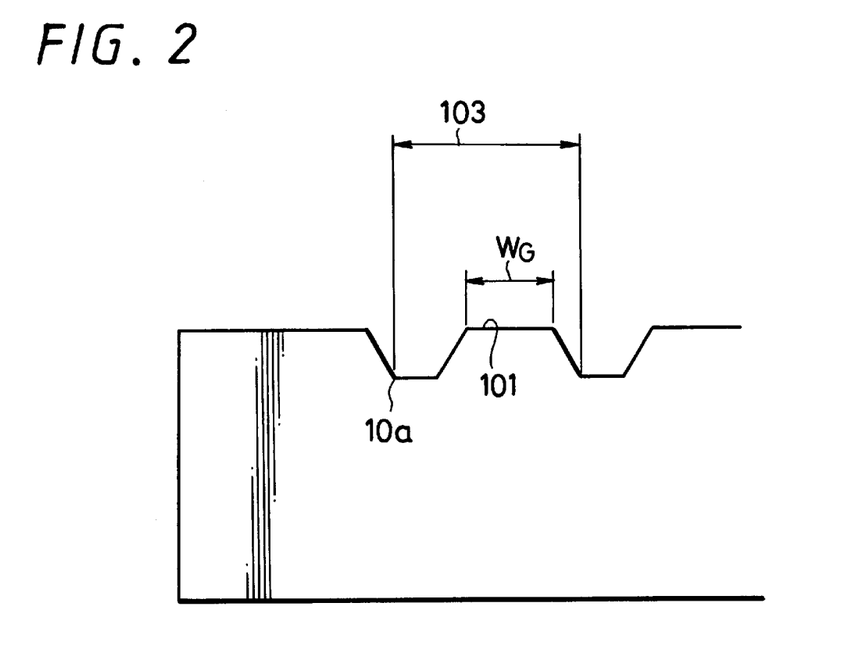
FIG. 2 is a diagram of a guide groove of a base substrate for a recordable optical disk.

As shown in FIG. 2, a guide groove structure for an optical disk is illustrated wherein a portion of the guide groove structure is irradiated with laser light during the mastering thereof. By definition and for purposes of explanation herein, the portion of the guide groove structure of the substrate closest to the light source is referred to as the groove and the portion of the substrate farthest from the light source is referred to as the land. Therefore, this guide groove structure includes a convex portion with reference to the light transmissive layer side which is referred to as a land 102. A portion of the guide groove structure formed as a concave portion with reference to the light transmissive layer side in FIG. 2 is referred to as a groove 101. A width of a flat portion obtained by excluding a tapered portion from a groove portion is referred to as a groove width WG. A sum of widths of a land 102 and a groove 101 adjacent thereto is referred to as a track pitch 103.

Figure 3:
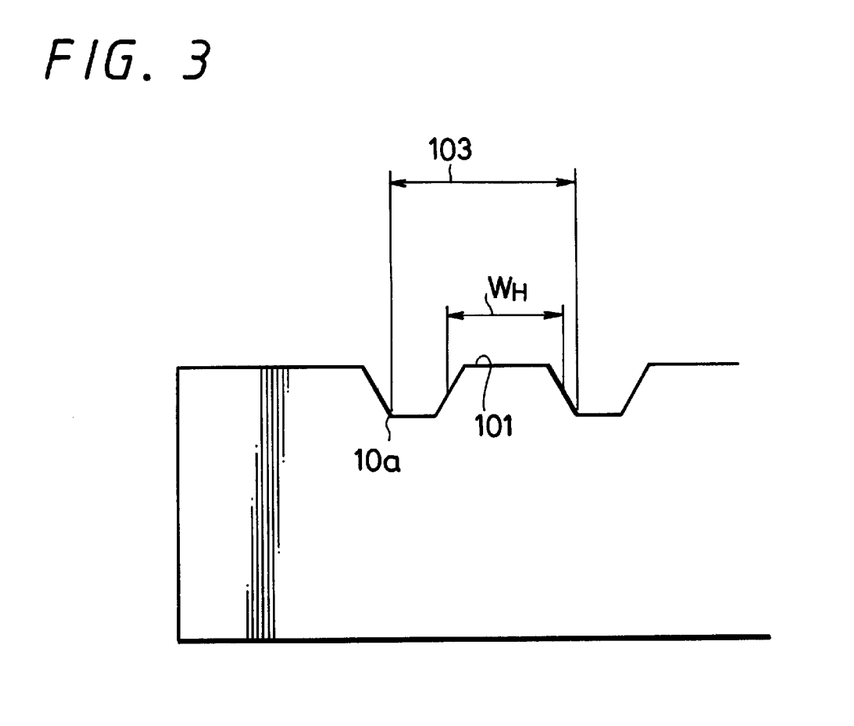
FIG. 3 is a diagram of a guide groove of a base substrate for a recordable optical disk.

As shown in FIG. 3, the width between adjacent mid-level positions of the respective tapered portions of the groove 101 is referred to as a half-width WH, and a value of (the half width WH of a groove/track pitch 103)×100% is referred to as a groove duty ratio.

Similar to the asymmetry of the above optical ROM disk, a groove duty ratio with respect to the guide groove formed on a recording disk is varied when a reflective film and an organic dye recording layer are formed thereon. Specifically, if a ratio of a concave-portion (groove) width of the guide groove to a convex-portion (land) width thereof at the organic dye recording layer as viewed from the light transmissive layer side is set to a desired ratio, the stamper must be manufactured to account for such changes of the groove duty ratio.

In addition, when a signal is recorded on the groove, the groove width becomes narrower after the reflective film and the organic dye recording layer are deposited thereon, and hence the guide groove must be formed by selecting a wider interval between transfer grooves of the stamper.

If a write-once optical disk employing an organic dye is manufactured, it is desirable that a reflective film is first formed on a substrate and then a groove duty ratio is set within the range of between about 35 to 50%.

If signals are recorded on both the land and groove, a minimum crosstalk of the signals recorded thereon is $\lambda(1+2m)/8$ (where m is 0 or a natural number). As the level difference of the land and the groove increases, influence of the cross erasure or the thermal cross talk between consecutive lands and grooves decreases. Accordingly, in consideration of the stamper for forming a substrate, establishment of $\lambda/8$ or $3\lambda/8$ is practical in order to satisfy these characteristics.

Figure 4:
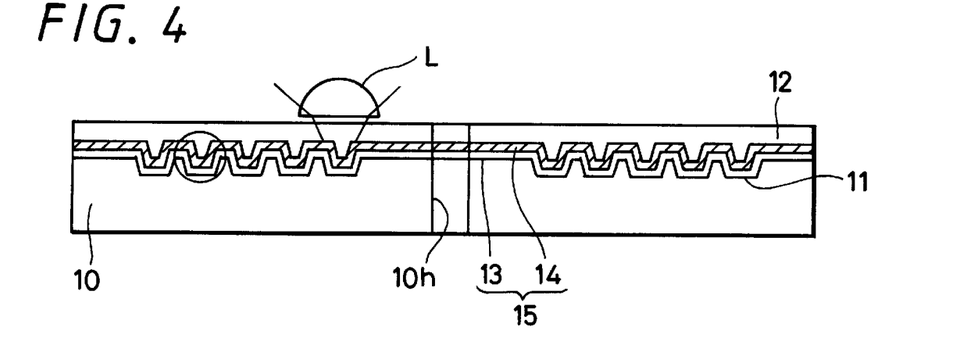
FIG. 4 is a schematic, cross-sectional view illustrating a first preferred embodiment of an optical recording medium in accordance with the teachings of the present invention.

In order to read or record information on the optical disk according to a first embodiment of the present invention through the light transmissive layer, the light transmissive layer is formed on the side opposite to the base, i.e., the substrate. FIG. 4 illustrates an optical recording medium according to a first embodiment of the present invention wherein an information recording layer 15 is formed successively of a reflective film 13 and an organic dye recording layer 14 on a guide groove 11 formed on a substrate and a light transmissive layer 12 is formed on the organic dye recording layer 14.

As shown in FIG. 4, the substrate 10 including the guide groove 11 is formed by injection molding a light-transmissive resin such as polycarbonate or the like. The reflective film 13 is then formed thereon so as to have a thickness of between approximately 20 to 60 nm. If the optical disk is of a ROM type, the reflective film 13 can be formed by ion beam sputtering or DC sputtering employing Al or an Al alloy Ti or Cr of 0.5 weight % or more. If Au is employed as a material for the reflective film, the reflective film can be formed by DC sputtering.

If the optical disk is write-once optical disk, then the organic dye recording layer 14 is formed on the reflective layer 13. The organic dye recording layer 14 can be formed by coating a material obtained by substituting other elements and substituents for cyanine, phthalocyanogen, diphthalocyanogen, anthracene, and materials forming them, by spin coating and then drying.

After the organic dye recording layer 14 is formed, the light transmissive layer 12 used for light irradiation for reading or recording information is deposited thereon.

Figure 5:
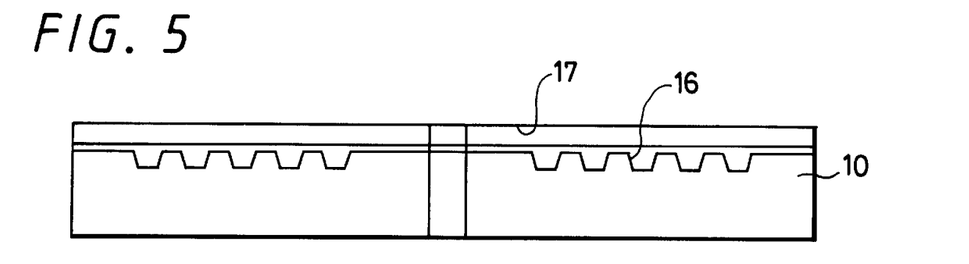
FIG. 5 is a schematic, cross-sectional view illustrating a second preferred embodiment of an optical recording medium in accordance with the teachings of the present invention.

The light transmissive layer 12 can be formed by coating a liquid ultraviolet curing resin on the organic dye recording layer 14, drawing the resin, and then curing the resin by irradiation of light. FIG. 5 illustrates an optical recording medium according to a second embodiment of the present invention wherein the light transmissive layer 12 can be formed by laminating a light transmissive film 17 having a uniform thickness on a liquid ultraviolet curing resin 16.

In this case, unevenness of the thickness of the light transmissive layer 12 is formed of the light transmissive film 17 and the bonded liquid ultraviolet curing resin 16 can be significantly reduced to 10 μm by placing the light transmissive film 17 having the same diameter as that of the substrate 10 on the substrate 10 through the ultraviolet curing resin 16. The ultraviolet curing resin 16 is then spin coated thereon with the light transmissive film 17 being employed as a weight for the ultraviolet curing resin 16.

In the past, when an organic dye recording layer 14 is formed on the substrate 10, a material obtained by dissolving an organic dye in an organic solvent is coated on the substrate 10, thereby requiring selection of an organic solvent which does not dissolve the polycarbonate substrate. However, according to the present invention, since the organic dye recording layer 14 is formed on the reflective layer 13, such a disadvantage is alleviated.

However, since the light transmissive layer 12 of the optical recording medium of the present invention is formed on the organic dye recording layer 14, if the ultraviolet curing resin is coated on the organic dye recording layer 14 to form the light transmissive layer 12, then the organic dye may be disadvantageously dissolved in the ultraviolet curing resin.

Figure 6:
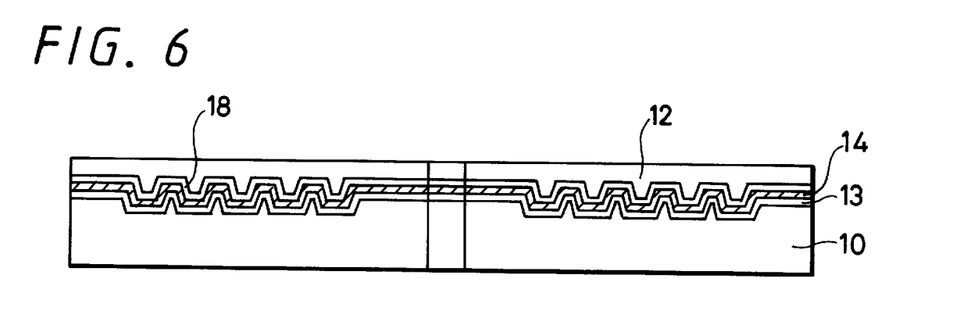
FIG. 6 is a schematic, cross-sectional view illustrating a third preferred embodiment of an optical recording medium in accordance with the teachings of the present invention.

FIG. 6 illustrates an optical recording medium according to a third embodiment of the present invention wherein a transparent protective layer 18 is formed between the organic dye recording layer 14 and the light transmissive layer 12 in order to prevent the organic dye from being dissolved in the ultraviolet curing resin. This transparent layer 18 is formed of a simple substance or a mixture of an oxide, a nitride, sulfide, fluoride, etc., such as Mg, Al, Si, Ti, Zn, Ga, Ge, Zr, In, Sn, Sb, Ba, Hf, Ta, and of rare-earth elements, such as Sc and Y.

Since a total amount of light refraction at the light transmissive layer 12 and the transparent protective layer 18 must be constant, it is desirable that the thickness of the light transmissive layer 12 satisfies the equation $10-[(1.53d/n)]$ to $177-[(1.53d)/n]$ [μm] assuming that the refractivity of the transparent protective layer 18 is n, its film thickness is d and the refractivity of the light transmissive layer 12 is 1.53.

As aforedescribed, the light transmissive layer 12 can be formed by spin coating the dropped ultraviolet curing resin on the substrate 10 to cure the same by irradiation of light, and the ultraviolet resin utilized should have a viscosity ranging from between approximately 300 cps to 30000 cps, so that the light transmissive layer 12 can be formed having the above thickness.

When the light transmissive layer 12 is formed by using the liquid ultraviolet curing resin, if the liquid ultraviolet resin is dropped at an inner periphery portion of the substrate 10 (e.g., at a position radially inwardly of the disk center by at least 25 mm), and then spin coated, the thickness at the inner periphery is different from that at the outer periphery due to the relationship between centrifugal force and viscous resistance. This difference may amount to 30 μm or more, and hence cannot satisfy the above-mentioned tolerance of the desired thickness.

In order to avoid this disadvantage, a center hole 10h is formed in the substrate (see FIG. 4) so that the ultraviolet curing resin can be dropped at the center portion of the substrate 10. For example, a polycarbonate sheet having a thickness of 0.1 mm is processed so as to have a circular shape with a diameter φ of 30 nm and is bonded to the center hole 10h. Then, the ultraviolet curing resin is dropped and then cured by irradiation of ultraviolet rays, and thereafter, the center hole 10h is punched again.

According to this method, the difference between thicknesses of the light transmissive layer 12 at the inner and outer peripheries thereof is reduced to 10 μm (p—p) or less.

In order to prevent the light transmissive layer 12 from projecting from the outermost periphery of the optical disk during formation thereof, it is desirable to set 120 mm+5 mm as a maximum value of a diameter of the optical disk with reference to a diameter (120 mm) of the CD and the like.

While in this embodiment the optical recording medium has the guide groove formed on the base and at least the reflective film, the organic dye recording layer, the light transmissive layer formed on the guide groove, the optical recording medium according to the present invention is not limited thereto.

The present invention can be applied to an optical recording medium having a light transmissive layer formed by using a polycarbonate sheet which is injecting molded or cast so as to have a thickness of 3 to 177 μm and which has a signal or a guide groove formed by thermal transfer of a stamper.

In this case, the signal or the guide groove is formed on the sheet which finally forms the light transmissive layer. As a result, the optical recording medium has at least the organic dye recording layer and the reflective film being successively formed on the guide groove from the side of the light transmissive layer.

Therefore, the optical recording medium may include the polycarbonate sheet and an irradiated-light-transmissive, transparent substrate with a thickness of between approximately 0.6 to 1.2 mm which are bonded to each other.

Since a certain amount of rigidity is required if the disk is formed of a single plate, it is desirable that the substrate 10 of the optical recording medium according to the present invention have a thickness of about 0.6 mm or more.

Figure 7:
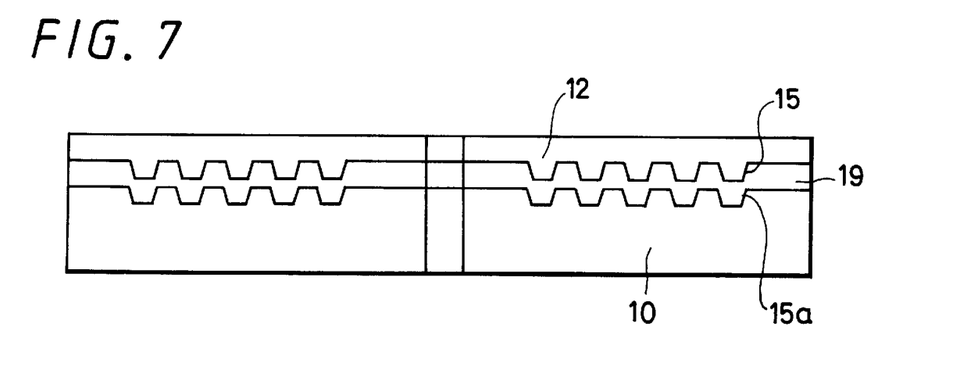
FIG. 7 is a schematic, cross-sectional view illustrating a fourth preferred embodiment of an optical recording medium in accordance with the teachings of the present invention.

The present invention also pertains to a multilayer optical recording medium having a plurality of information recording layers each of which is formed of a reflective film and an organic dye recording layer which are laminated on a guide groove. FIG. 7 illustrates an optical recording medium according to a fourth embodiment of the present invention having such a multilayer optical recording medium. This multilayer optical recording medium includes a multilayer optical recording medium having a second information recording layer 15b formed on a first information recording layer 15a which is formed by injection molding of the substrate 10 and separated therefrom by an intermediate layer 19.

Figure 8:
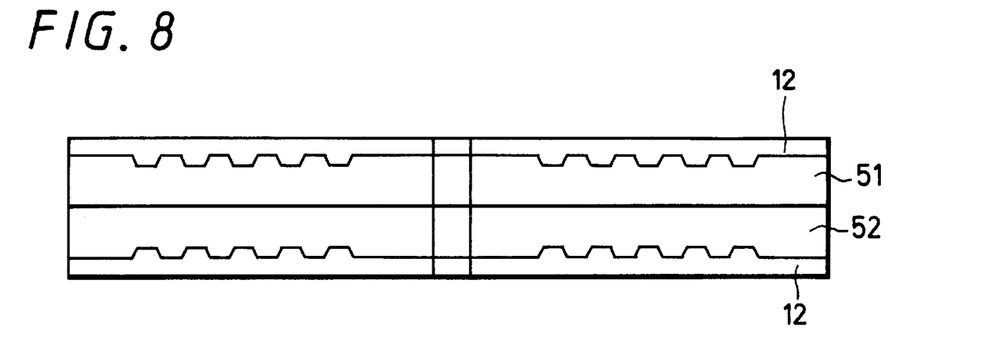
FIG. 8 is a schematic, cross-sectional view illustrating a fifth preferred embodiment of an optical recording medium in accordance with the teachings of the present invention.

FIG. 8 shows an optical recording medium according to a fifth embodiment of the present invention wherein the optical recording medium has two substrates 51 and 52 bonded together each having guide grooves formed thereon. If the optical recording medium of FIG. 8 is manufactured, the thickness of each substrate is set to about 0.3 mm.

Figure 9:
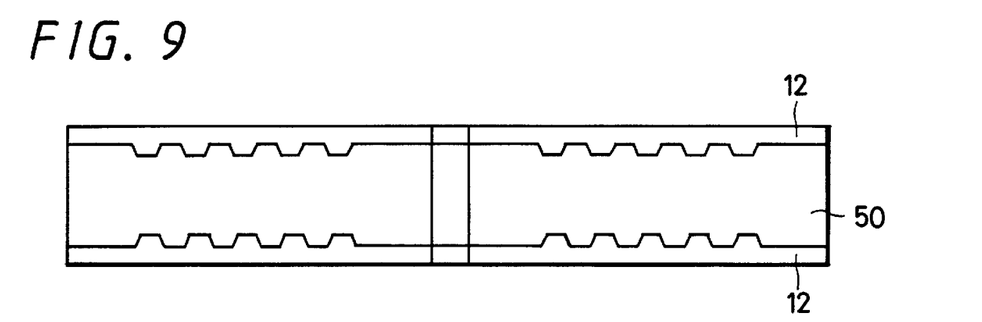
FIG. 9 is a schematic, cross-sectional view illustrating a sixth preferred embodiment of an optical recording medium in accordance with the teachings of the present invention.

FIG. 9 illustrates an optical recording medium according to a sixth embodiment of the present invention wherein an information recording layer and a light transmissive layer are formed on each side of a single substrate 50.

If the optical recording medium having the multilayer structure shown in FIG. 7 is irradiated with recording and reproduction light from the side of the light transmissive layer 12 opposite to the substrate 10, reflectiveness of the reflective films forming a plurality of laminated information recording layers for the recording and reproduction light must be set so as to gradually become smaller in the direction toward the light incident surface side, i.e., the side of the light transmissive layer 12.

Figure 10:
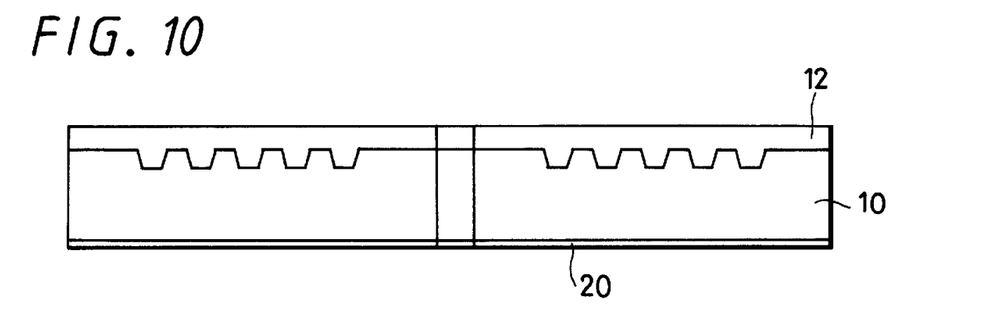
FIG. 10 is a schematic, cross-sectional view illustrating a seventh preferred embodiment of an optical recording medium in accordance with the teachings of the present invention.

A skew (bend or warp) tend to easily occur in the optical disks shown in FIGS. 4 to 7. FIG. 10 shows an optical recording medium according to a seventh embodiment of the present invention wherein in order to reduce the skew (tilt or bending of the disk), an ultraviolet curing resin is coated as a skew correction member 20 on a surface of the base 10 opposite to the side of the light transmissive layer 12. The skew correction member 20 may be formed by using the same material as that of the light transmissive layer 12 or by using a material having a higher ratio of shrinkage after curing as compared with that of the material of the light transmissive layer 12.

In order to record and reproduce signals with a high recording density optical recording medium, an optical pickup having an objective lens with a relatively high numerical aperture (N.A.) to be described later is required. In this case, the distance (hereinafter referred to as a working distance (W.D.)) between the objective lens and the light transmissive layer surface must be narrower as compared with the distance employed in an ordinary pickup. However, as a result of this narrower working distance, the objective lens may collide with the light transmissive layer surface and hence damage it.

Figure 11:
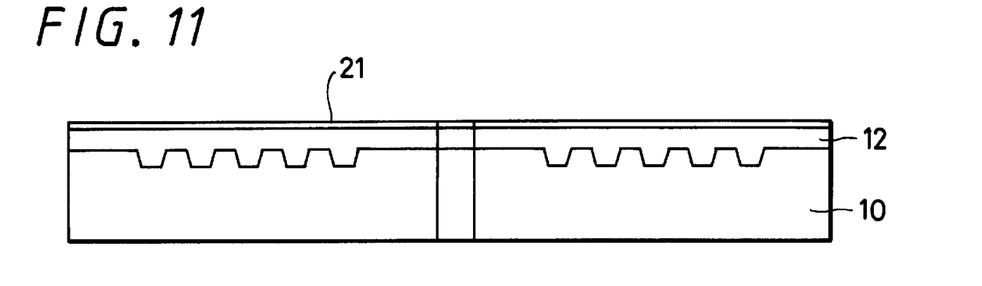
FIG. 11 is a schematic, cross-sectional view illustrating a eighth preferred embodiment of an optical recording medium in accordance with the teachings of the present invention.

In order to prevent this damage resulting from these collisions, an optical recording medium according to an eight embodiment of the present invention has been designed as is shown in FIG. 11. In this embodiment, a protective transparent layer 21 is formed on the light transmissive layer 12 having a hardness higher than a pencil hardness H to prevent this damage.

If the light transmissive layer 12 is made thinner, it tends to easily absorb dusts. Therefore, the protective transparent layer 21 can be provided with an antistatic capability in order to avoid such adsorption of dust particles and other foreign materials.

If a silane processing is subjected to a surface of the information recording layer formed of the reflective film and the organic dye recording layer of the optical recording medium described herein, then it is possible to improve tight adhesion between the information recording layer and the light transmissive layer.

The optical recording medium according to the present invention can also be manufactured in accordance with the following method.

Figure 12A:
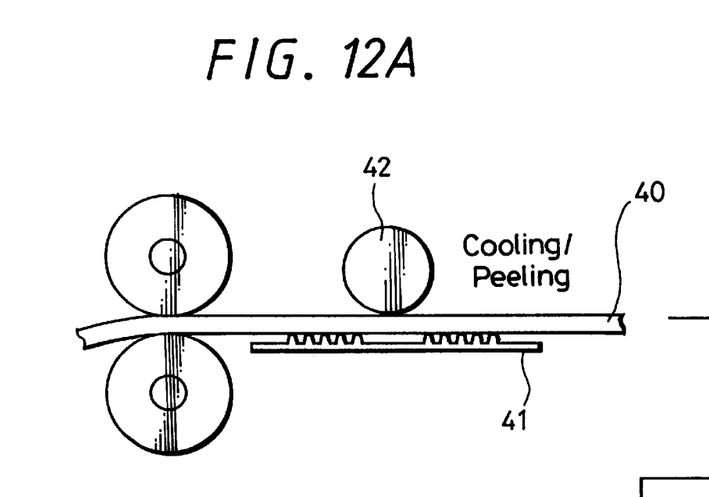
FIGS. 12A to 12E are diagrams illustrating processes used for manufacturing the optical recording medium according to the present invention.

As shown in FIG. 12A, a polycarbonate sheet 40 having a thickness of approximately 100 μm is manufactured by extrusion or casting. A stamper 41 heated to a temperature higher than the glass transition point and a roller 42 are pressed to the sheet 40 with a pressure of approximately 280 Kgf, for example.

Figure 12B:
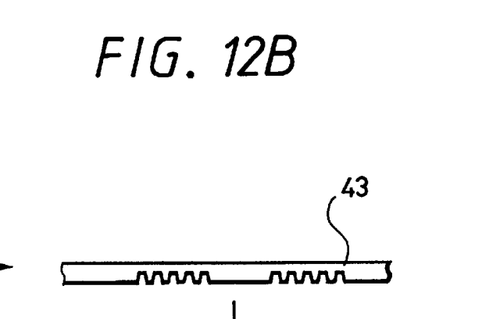

After the above operation, the sheet 40 is processed by the stamper 41 so as to have a predetermined size so that a thin substrate 43 is manufactured with the transferred pits or guide grooves of the stamper 41 as is shown in FIG. 12B.

Subsequently, the reflective film and the organic dye recording layer are deposited on the guide groove by a process similar to the above-mentioned manufacturing method.

Figure 12C:
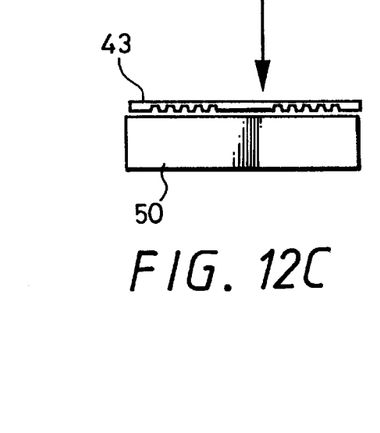
Figure 12D:
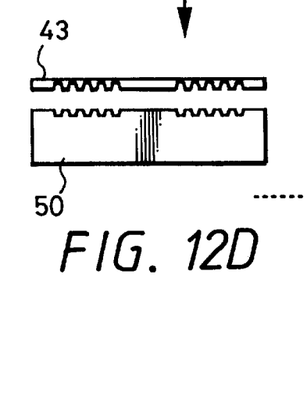
Figure 12E:
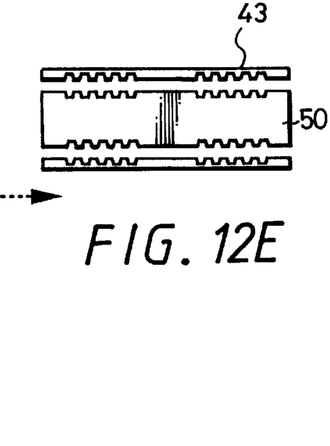

Thereafter, the ultraviolet curing resin is dropped on a disk-shaped transparent substrate 50 independently manufactured by injection molding. The thin substrate 43 is mounted on the transparent substrate 50 and then pressed thereon. Ultraviolet rays are irradiated from the side of the transparent substrate 50 so that the transparent substrate 50 and the thin substrate 43 are bonded to each other. Thus, an optical recording media respectively having one, two and four recording layers as shown in FIGS. 12C, 12D and 12E can be manufactured.

The formation of a pit or its associated depth on the substrate will now be described. For this purpose, it is assumed that the refractivity of the light transmissive layer is N. A depth or a pit or a groove in which the highest modulation can be obtained is (λ/4)/N. A depth of a pit or a groove in the optical recording medium or ROM type and the like is set to the above value.

If the groove recording or the land recording, a tracking error signal is obtained by a push-pull operation, a push-pull signal becomes maximum when the depth of the pit or the groove is (λ/8)/N.

Moreover, if a signal is recorded on both the land and the groove, then the groove depth must be determined in view of the characteristics of the servo signal and of the crosstalk and cross-erasure characteristics. Experimental results indicate that the crosstalk is minimized when the groove depth is within the range of from (λ/6)/N to (λ/3)/N and the cross-erasure is less influential as the groove deepens. If both the crosstalk and cross-erasure characteristics are satisfied in consideration of the groove inclination and the like, both of the characteristics become optimum when the depth is (3/8λ)/N. The high-recording-density optical recording medium according to the present invention can be applied to an optical recording medium having a groove depth in the above range.

Figure 13:
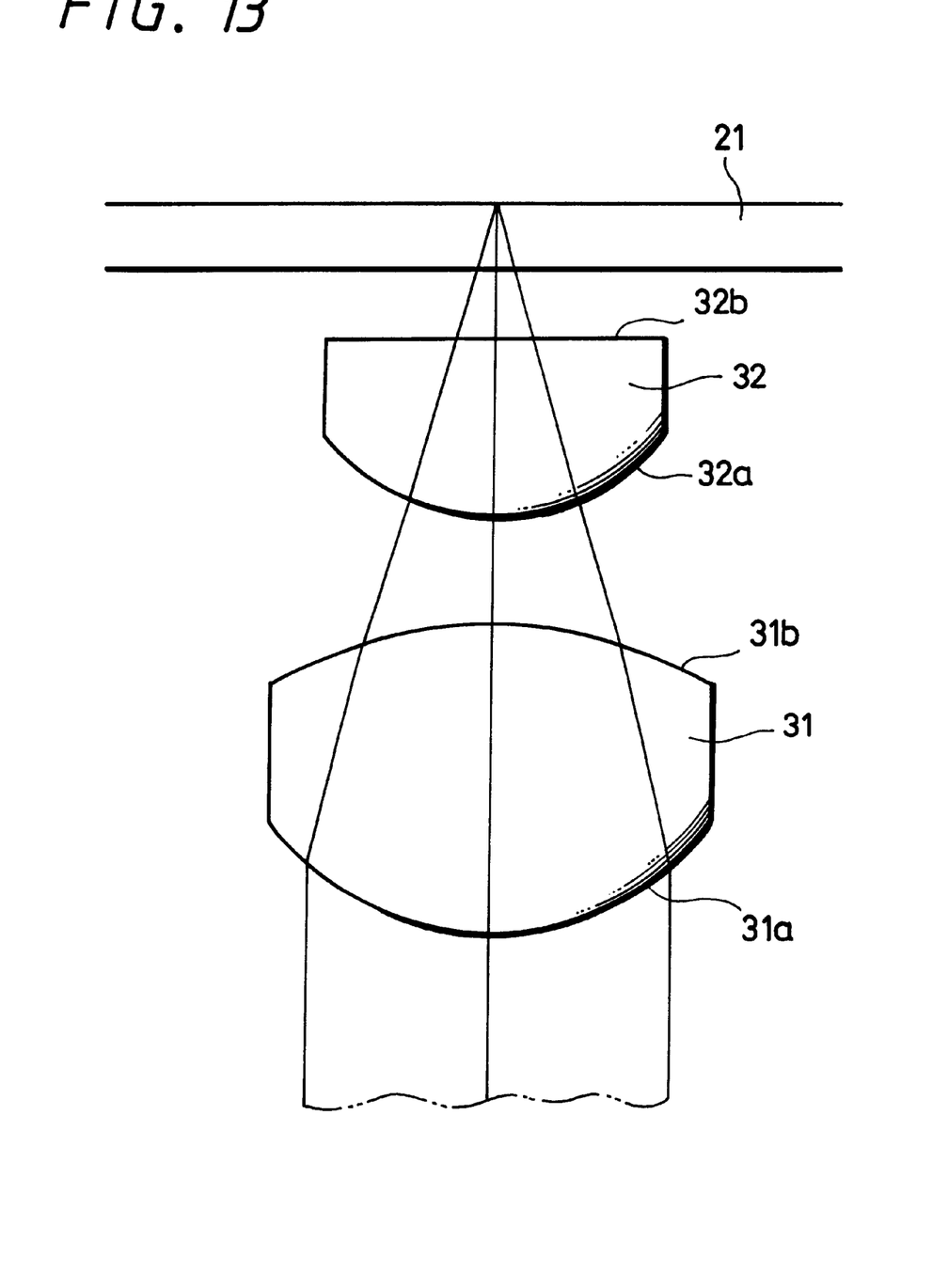
FIG. 13 is a schematic diagram showing a preferred embodiment of a two-element lens arrangement employed in an optical system for recording and reproducing the optical disk medium in accordance with the teachings of the present invention.

An optical arrangement for obtaining a higher numerical aperture (N.A.) will now be described. FIG. 13 illustrates an arrangement of lenses of an optical disk apparatus for obtaining a higher value of the numerical aperture (N.A.), i.e., an arrangement of a two-element lens thereof.

It is assumed that the optical disk apparatus shown in FIG. 13 has a laser light source emitting laser light having a wavelength of about 380 nm.

As shown in FIG. 13, the optical disk apparatus has a second lens 32 provided between a first lens 31 and a disk 21. Since the optical disk apparatus has a two-element lens arrangement, it is possible to set the numerical aperture (N.A.) to 0.7 or more. In addition, the interval (W.D.) between a first plane 32a of the second lens 32 and a surface of the disk 21 can also be narrowed. It has also been found desirable to form a first plane 31a, a second plane 31b, a third plane 32a and a fourth plane 32b of the first and second lenses 31 and 32 an aspherical planes.

Since the two-element lens arrangement is employed, it is possible to record and reproduce the above optical recording medium with high recording density. According to the present invention, the optical recording medium can thus attain a storage capacity of at least 8 GB for the recording signal.

According to the present invention, since the duty ratio of the concave portion of the guide groove structure on the substrate is adjusted, even if the organic dye recording layer and the reflective layer are formed on the guide groove structure, an optical recording medium in which the concave portion (land) of the guide groove structure and the convex portion (groove) thereof are formed so that a ratio of the width of the concave portion to that of the convex portion is set at a desired ratio.

Moreover, the present invention allows the optical recording disk to have a higher recording capacity as compared with that of known disks even when a relatively simple recording and reproducing apparatus is used.

Having described preferred embodiments of the present invention with reference to the accompanying drawings, it is to be understood that the present invention is not limited to the above-mentioned embodiments and that various changes and modifications can be made therein by one skilled in the art without departing from the spirit or scope of the present invention as defined in the appended claims.

What is claimed is:

1. An optical recording disk for storing data therein, said optical recording disk being adaptable for use with an optical disk recording and/or reproducing apparatus, the optical recording disk comprising:

a base;

a guide groove formed on said base;

an information recording layer formed at least of an organic dye recording layer provided on said guide groove; and a light transmissive layer formed on top on the recording layer having a thickness ranging from between approximately 3 to 177 μm, wherein the unevenness Δt of the thickness of said light transmissive layer is expressed by:

$$|\Delta t| \leq 6[5.26(\lambda/N.A.^4)](\mu m).$$

2. The optical recording disk of claim 1, wherein said light transmitting layer is formed by spin-coating a liquid ultraviolet curing resin.

3. The optical recording disk of claim 1, wherein said light transmissive layer is formed of a light transmissive film adhered by a liquid ultraviolet curing resin.

4. The optical recording disk of claim 1, wherein a transparent protective layer is formed between said organic dye recording layer and said light transmissive layer.

5. The optical recording disk of claim 4, wherein if refractivity of said transparent protective layer is n and its film thickness is d, then a thickness d' of said light transmissive layer satisfies $$3-(1.53d/n) \leq d' \leq 177-(1.53d/n)[\mu m].$$

6. The optical recording disk of claim 4, wherein said transparent protective layer is formed of a single substance or mixture of an oxide, a nitride, a sulfide, or a fluoride selected from the group consisting Mg, Al, Si, Ti, Zn, Ga, Ge, Zr, In, Sn, Sb, Ba, Hf, Ta, and rare earth elements.

7. The optical recording disk of claim 6, wherein said rare earth elements are Sc or Y.

8. The optical recording disk of claim 1, wherein said organic dye recording layer is formed of a material obtained by substituting other elements and substituents for cyanine, phthalocyanogen, diphthalocyanogen, and anthracene.

9. The optical recording disk of claim 1, wherein said information recording layer is also formed of a reflective film.

10. The optical recording disk of claim 9, wherein said reflective film is formed by subjecting Al or an Al alloy to ion beam sputtering.

11. The optical recording disk of claim 9, wherein said reflective film is formed by subjecting Au to DC sputtering.

12. The optical recording disk of claim 9, wherein said reflective film is formed by subjecting an Al alloy having at least 0.5 weight % Cr to DC sputtering.

13. The optical recording disk of claim 9, wherein said reflective film is formed by subjecting an Al alloy containing at least 0.5 weight % Ti to DC sputtering.

14. The optical recording disk of claim 1, wherein ultraviolet curing resin is coated on a surface opposite to said light transmissive layer.

15. The optical recording disk of claim 1, wherein a shrinkage ratio after curing of an ultraviolet curing resin coated on a surface opposite to said light transmissive layer is higher as compared with a shrinkage ratio of the material forming said light transmissive layer.

16. The optical recording disk of claim 1, wherein ultraviolet curing resin is coated on a surface of said light transmissive layer.

17. The optical recording disk of claim 1, wherein a surface of said light transmissive layer is subjected to a silane processing.

18. The optical recording disk according to claim 1, wherein said base is formed of two substrate halves on which one of said plurality of information recording layers are formed which are bonded to each other to thereby obtain a double-sided structure.

19. An optical recording disk according to claim 1, wherein reflectivities of the reflective films forming said plurality of laminated information recording layers are smaller toward a light incident side surface.

20. The optical recording disk of claim 1 wherein said base is formed of thermoplastic resin.

21. The optical recording disk of claim 1 wherein said base has a thickness ranging from between approximately 0.3 to 1.2 mm.

22. The optical recording disk of claim 1 and further including a multilayer optical recording medium having first information recording layers formed by injection molding of the base and a second information recording layer separated from said first information recording layer by an intermediate layer.

23. An optical recording disk comprising:
a light transmissive layer having a thickness ranging from approximately 3 to 177 $\mu$m;
a guide groove formed on said light transmissive layer including information pits formed by thermal transfer of a stamper; and
an information recording layer formed of at least an organic dye recording layer provided on said guide groove.

24. The optical recording disk of claim 23, and further including a supporting substrate for supporting said light transmissive layer and said information recording layer, said supporting substrate being formed of a transparent plate to enable UV bonding.

25. The optical recording disk of claim 23, wherein said organic dye recording layer is formed of a material obtained by substituting other elements and substituents for cyanine, phthalocyanogen, diphthalocyanogen, and anthracene.

26. The optical recording disk of claim 23 wherein said information recording layer is also formed of a reflective film.

27. The optical recording disk of claim 26, wherein said reflective film is formed by subjecting Al or an Al alloy to ion beam sputtering.

28. The optical recording disk of claim 26, wherein said reflective film is formed by subjecting Au to DC sputtering.

29. The optical recording disk of claim 26, wherein said reflective film is formed by subjecting an Al alloy containing at least 0.5 weight % Cr to DC sputtering.

30. The optical recording disk of claim 25, wherein said reflective film is formed by subjecting an Al alloy containing at least 0.5 weight % Ti to DC sputtering.

31. The optical recording disk of claim 23, wherein an ultraviolet curing resin is coated on a surface opposite to said light transmissive layer.

32. The optical recording disk of claim 31, wherein a shrinkage ratio after curing of an ultraviolet curing resin coated on a surface opposite to said light transmissive layer is higher as compared with a shrinkage ratio of the material forming the light transmissive layer.

33. The optical recording disk of claim 23, wherein ultraviolet curing resin is coated on a surface of said light transmissive layer.

34. The optical recording disk of claim 23, wherein a surface of said light transmissive layer is subjected to a silane processing.

35. The optical recording disk of claim 23, wherein a plurality of information layers each formed of at least a reflective film and an organic dye recording layer are laminated on said guide groove.

36. An optical disk apparatus for recording information on or reproducing information from an optical recording disk having a base, a guide groove structure formed on said base, an information recording layer formed on said base, an information recording layer formed of at least an organic dye recording layer on said guide groove, and a light transmissive layer formed on top on the recording layer having a thickness of between approximately 3 to 177 $\mu$m, said optical disk apparatus comprising:
a laser light source for emitting a laser having a wavelength ranging from approximately 380 to 680 nm; and
an optical lens arrangement having a numerical aperture of the optical disk (N.A.) ranging from approximately 0.7 to 0.9 for converging the laser at a signal recording surface of said optical disk.

37. The optical disk apparatus of claim 36 wherein the base of said optical recording disk is formed of thermoplastic resin.

38. The optical disk apparatus of claim 36 wherein the base of the optical recording disk has a thickness ranging from between approximately 0.3 to 1.2 mm.

39. The optical disk apparatus of claim 36 wherein said information recording layer is formed of a reflective film.

40. An optical recording disk for storing data therein, said optical recording disk being adaptable for use with an optical disk recording and/or reproducing apparatus, the optical recording disk comprising:
a base;
a guide groove formed on said base;
an information recording layer formed at least of an organic dye recording layer provided on said guide groove;
a multilayer optical recording medium having a first information recording layer formed by injection molding of the base and a second information recording layer separated from said first information recording layer by an intermediate layer; and
a light transmissive layer formed on top on the recording layer having a thickness ranging from between approximately 3 to 177 $\mu$m, wherein the unevenness $\Delta t$ of the thickness of the light transmissive layer is expressed by the equation $|\Delta t| \leq 6$ ($\mu$m).

* * * * *

UNITED STATES PATENT AND TRADEMARK OFFICE
CERTIFICATE OF CORRECTION

PATENT NO.   : 6,246,656 B1
DATED        : July 24, 2001
INVENTOR(S)  : Gary Karlin Michelson It is certified that error appears in the above-identified patent and that said Letters Patent is hereby corrected as shown below:

Title page,
ABSTRACT,
Line 1, change "place" to – placed --;
Line 3 thereof, change "insuing" to – ensuing --.

References Cited, U.S. PATENT DOCUMENTS,
Change "4,847,327" to – 4,848,327 --.

Columns 11 and 12, claim 27,
Line 4, change "and" to – an --;

Column 12, claim 33,
Line 1, change "20" to – 29 --;

Column 13, claim 53,
Line 2, change "plant" to – implant --;

Column 14, claim 70,
Line 3, after "bodies" insert – to the other of the adjacent vertebral bodies --;

Column 14, claim 81,
Line 4, change "inerstion" to –insertion --;

Column 14, claim 82,
Line 1, change "wherein said" to – in combination with an –;
Line 2, change "implant has a leading end for insertion" to – insertion device for inserting said implant --;

Column 15, claim 87,
Line 1, change "83" to – 86 --;

Column 16, claim 110,
Line 1, change "82" to – 83 --;

Column 16, claim 111,
Line 4, change "iomplant" to – implant --;

Column 17, claim 131,
Line 1, change "116" to – 130 --;

UNITED STATES PATENT AND TRADEMARK OFFICE
CERTIFICATE OF CORRECTION

PATENT NO. : 6,246,656 B1
DATED : July 24, 2001
INVENTOR(S) : Gary Karlin Michelson It is certified that error appears in the above-identified patent and that said Letters Patent is hereby corrected as shown below:

Column 17, claim 132,
Line 1, change "117" to -- 131 --;

Column 18, claim 138,
Line 2, change "a" to -- an --;
Line 3, change "said" (first occurrence) to -- the --;

Column 18, claim 139,
Line 4, delete "toward";

Column 18, claim 139,
Line 5, delete "and";

Column 19, claim 160,
Line 1, change "139" to -- 159 --;

Column 20, claim 165,
Line 3, change "oppoiste" to -- opposite --;
Line 4, change "siad" to -- said --;

Column 20, claim 166,
Line 4, change "engge" to -- engage --.

Signed and Sealed this

Twenty-seventh of November, 2001

Attest:

*Nicholas P. Godici*

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,246,656 B1
DATED : June 12, 2001
INVENTOR(S) : Osamu Kawakubo

It is certified that error appears in the above-identified patent and that said Letters Patent is hereby corrected as shown below:

This certificate supersedes Certificate of Correction issued November 27, 2001, the number was erroneously mentioned and should be deleted since no Certificate of Correction was granted.

Signed and Sealed this

Twenty-sixth Day of March, 2002

Attest:

JAMES E. ROGAN
*Attesting Officer*     *Director of the United States Patent and Trademark Office*